Feb. 23, 1971 A. BLOOM 3,566,266
VOLTMETER
Filed March 9, 1967 2 Sheets-Sheet 1

INVENTOR
Abraham Bloom
BY *Aidelman and Wolffe*
ATTORNEY

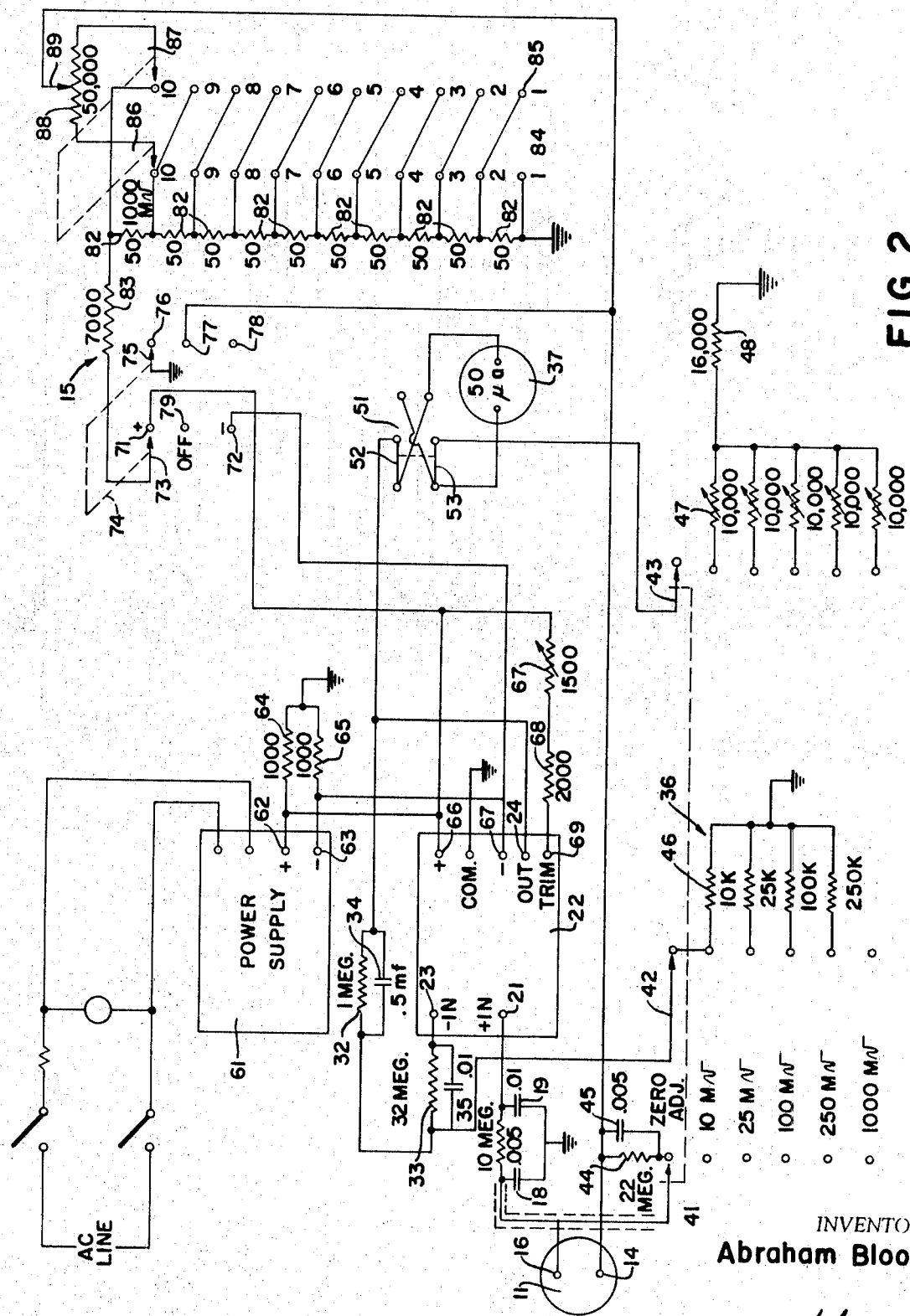

United States Patent Office 3,566,266
Patented Feb. 23, 1971

3,566,266
VOLTMETER
Abraham Bloom, Silver Spring, Md., assignor to National Instrument Laboratories, Inc., Rockville, Md., a corporation of Maryland
Filed Mar. 9, 1967, Ser. No. 621,971
Int. Cl. G01r *1/30, 5/22*
U.S. Cl. 324—105     7 Claims

ABSTRACT OF THE DISCLOSURE

A semiconductor differential operational amplifier responds to the source being measured and feeds a meter. The amplifier input offset current is balanced as a function of temperature by connecting one of the amplifier inputs to a feedback resistance having a value approximately equal to the series resistance of the source and a large resistance, connected to the other amplifier input. The input and feedback resistances are filtered to remove stray A.C. pickup so that the response time of the meter is on the order of 2 seconds. The source being measured is connected to ground through a bucking voltage.

---

Figure 1:
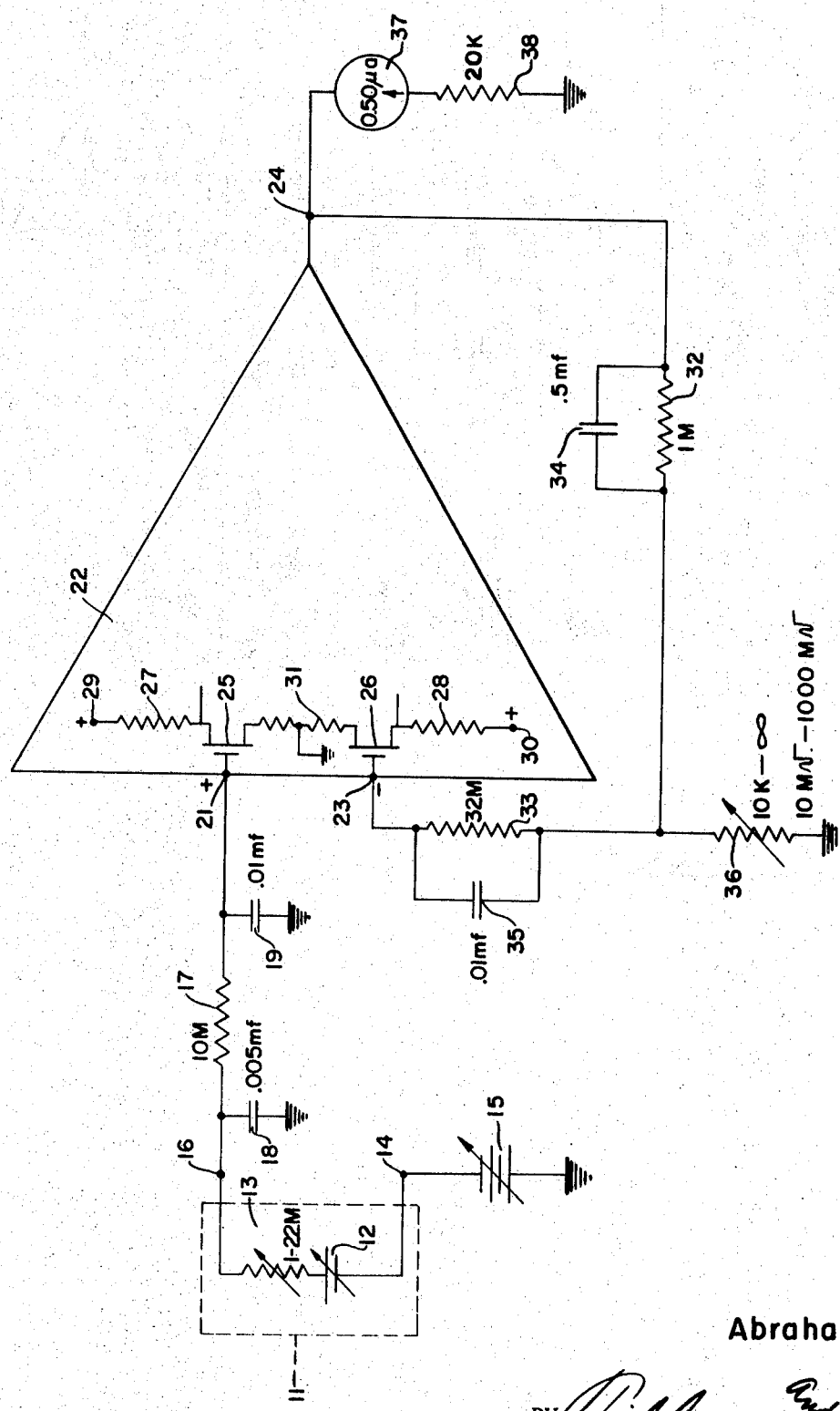

The present invention relates generally to voltmeters and more particularly to a voltmeter responsive to sources having large variable impedances, wherein a semiconductor D.C. operational amplifier has a negative feedback path comprising a fixed impedance having a relatively large value selected to maintain the amplifier characteristics independent of supply voltages or component characteristics.

A characteristic required of systems for measuring the voltage of high impedance sources is that the input impedance of the measuring device be as great as possible, whereby the source is not loaded by the measuring instrument. In the prior art, electrometer tube circuits and operational amplifiers have impedances approaching those required for measuring the voltage from sources such as specified above. Operational amplifiers possess the added advantage that variations in the characteristics of the amplifier, per se, do not have any appreciable effect on the magnitude of the voltage derived. In consequence, in seeking an appropriate system for deriving an indication of the voltage generated by a voltage source having a high internal but variable impedance, it was felt that the use of an operational amplifier would be most advantageous.

It was found, however, that conventional operational amplifier circuits did not perform with the required accuracy for voltage sources having internal impedances that might vary between 1 and 22 megohms. In particular, available semiconductor operational amplifiers, having the prerequisite input impedances, are not sufficiently stable as a function of temperature. Of course, the use of semiconductor operational amplifiers is desired because of their limited power consumption and small size.

In the normal operation mode of available D.C. operational amplifiers, a pair of differential input terminals are provided, one responsive to the input signal and the other being in a negative feedback loop with the amplifier output terminal. In the conventional circuit, equal currents (offset currents) under quiescent conditions are supplied by the amplifier to the two input terminals. The equal offset currents are established by connecting the input terminal in the feedback loop to ground through a resistance having a value on the order of 10,000 ohms while the signal responsive input terminal is connected directly through an input resistance, generally having a value on the order of 1 megohm, to the source. As the temperature of the amplifier varies the impedances of the active semiconductor elements within the amplifier change, whereby the offset currents applied to the signal and feedback input terminals vary in a like manner.

With the high impedance applications of the present invention, however, it was found that the prior art circuit arrangement did not provide adequate temperature compensation. Temperature variations caused differing offset currents to be supplied to the two input terminals of the amplifier because of the material difference of the impedances of the external circuitry connected to them. With impedances on the order of 10 megohms or greater connected to the signal input terminal of the amplifiers, the internal amplifier impedances are on the same order of magnitude as the impedance levels of the external circuits, whereby the external circuits cannot be excluded in considering the values of the offset currents utilized for temperature compensation.

I have found that this problem can be solved by connecting, in the feedback loop of the operational amplifier, a resistance having a value approximately equal to the sum of the resistances of the source and amplifier input resistor. By connecting equal valued resistances to the two input terminals of the differential operational amplifier, the offset current supplied by the amplifier to its two inputs terminals remain relatively constant over wide variations in temperature.

Because of the extremely large resistive impedances employed in the input and feedback circuits of the circuit, stray 60 cycle A.C. voltages are developed across these resistances. To eliminate these voltages, connected across the resistances are capacitors having reactances to 60 cycle signals that are negligible compared to the impedances of the resistances. Virtually complete filtering of stray 60 cycle pickup is attained by filtering both the feedback and input resistances because of the negative feedback effect combined with the normal attenuating effect of the capacitors.

One problem, however, in filtering the input of an operational amplifier having input resistances over 20 megohms is that the R.C. time constant of the circuit is materially increased. A user of the meter will be annoyed by the length of time required to obtain a reading, if the time constant is in excess of 5 seconds. To prevent annoyance, the input impedance time constant for the amplifier is selected to be between 1 and 5 seconds. With such a time constant for the input circuit of the amplifier, I have found that satisfactory attenuation of the A.C. pickup is attained by providing a two-to-one reactance ratio between the capacity in the input circuit to the capacity in the feedback circuit at 60 cycles per second.

It is, accordingly, an object of the present invention to provide a new and improved meter particularly adapted for measuring the voltage of a large variable impedance source.

Another object of the present invention is to provide a new and improved meter for measuring the voltage of a high impedance source, which system employs a semiconductor operational amplifier that is temperature compensated.

It is a further object of the present invention to provide a meter particularly adapted for measuring the voltage of high impedance sources wherein the problems of 60 cycle stray pickup are obviated even though resistors of extremely large value are utilized.

Still another object of the present invention is to provide a gauge system, utilizing temperature compensated operational amplifier circuits, for measuring the voltage of sources having internal impedances that vary between 1 and 22 megohms and from which are derived voltages on the order of less than 10 millivolts.

The above and still further objects, features and advantages of the present invention will become apparent upon consideration of the following detailed description of one specific embodiment thereof, especially when taken in conjunction with the accompanying drawings, wherein:

FIG. 1 is a partially schematic, partial block diagram of a preferred embodiment of the present invention; and FIG. 2 is a circuit diagram wherein the impedances shown in the drawing of FIG. 1 are illustrated specifically.

Reference is now made to FIG. 1 of the drawings, wherein the voltage source 11 to be measured or gauged is illustrated as comprising variable D.C. supply or battery 12 connected in series circuit with variable resistance 13. The voltage developed by supply 12 is variable between 0 and ±1 volts, but is generally in the 10 to 100 millivolt range. The impedance of source 11, represented by resistor 13, is also variable anywhere between 1 megohm and 22 megohms. Exemplary of sources having these characteristics are probes or electrodes for indicating the concentration of iodide, sulfate, phosphate, or nickel ions in solution. Such electrodes are sold commercially by the assignee of the present invention and are described in a paper presented at the Pittsburgh Conference on Analytical Chemistry and Applied Spectroscopy, held Mar. 1–5, 1965.

To derive the most sensitive indication possible of the voltage of source 11, terminal 14 thereof is connected to one terminal of D.C. bucking voltage 15, the other terminal of which is grounded.

To prevent stray 60 cycle currents from being developed across the high impedance of source 11, 10 megohm resistance 17 is connected to terminal 16 and shunted to ground through 0.05 microfarad capacitor 18. Additional filtering is provided by connecting the output terminal of resistance 17 to ground through 0.01 microfarad filtering capacitor 19.

The D.C. voltage developed across capacitor 19 is fed to the positive input signal terminal 21 of D.C., differential semiconductor, operational amplifier 22. Operational amplifier 22 also includes a negative input terminal 23 and output terminal 24 for deriving a voltage indicative of the algebraic difference between the D.C. signals at terminals 21 and 23. The input stages of amplifier 22 comprise matched field effect transistors 25 and 26 having their gate electrodes respectively connected to terminals 21 and 23, their drain electrodes connected to ground through balancing resistors 31 and their source electrodes connected through resistances 27 and 28 to the positive D.C. supply voltages at terminals 29 and 30. The difference voltage developed between the source electrodes of field effect transistors 25 and 26 is coupled to additional stages, not shown, so that the amplifier open loop gain is on the order of at least 50,000. Amplifier 22 is further characterized by an extremely high impedance between input terminals 21 and 23; the impedance between these terminals being on the order of $10^{11}$ ohms and the impedance between each terminal and ground being on the order of $10^{12}$ ohms. An amplifier having these characteristics, and preferably employed in the circuit, is available from Philbrick Researches, Inc. Dedham, Mass., and is described in Philbrick Bulletin PP 25A/1B1, Rev. 1, May 1965.

The voltage developed at output terminal 24, proportional to the difference between the voltages at terminals 21 and 23, is fed back to negative input terminal 23 via a negative feedback loop. The negative feedback loop comprises one megohm resistance 32, series connected with 32 megohm resistance 33. Resistors 32 and 33 are respectively shunted by 0.5 microfarad capacitor 34 and 0.01 microfarad capacitor 35 for filtering out stray 60 cycle currents. Connected between the junction of resistors 32 and 33 and ground is resistance 36, variable in steps between 10,000 ohms and infinity for input voltages respectively between the range of 10 millivolts and 1,000 millivolts.

To provide an indication of the voltage at terminal 24, indicative of the voltage of source 11, meter 37 having a full scale reading of 50 microamperes, is series connected with fixed 20,000 ohm resistor 38 between the amplifier output terminal and ground.

The circuit of FIG. 1 enables the voltage of source 11 to be measured, particularly in the low level range of 10 millivolts full scale, with greater accuracy than any instrument developed previously to my knowledge. Because of the extremely high D.C. input impedance of amplifier 22, D.C. currents on the order of 0.1 pico amperes are drawn from source 11 and variations of the source impedance do not materially alter the current supplied to the amplifier for a given source voltage. The extremely low currents drawn from source 11 and high impedance driven by the source necessitate compensation for variations in the D.C. offset currents supplied to terminals 21 and 23 of amplifier 22, as a function of temperature, particularly in the low voltage range mentioned.

Temperature compensation is attained, according to the present invention, by inserting 32 megohm resistance 33 in the input circuit of terminal 23 of amplifier 22. Resistance 33 has a value equal to the sum of the maximum resistances of source 11 and input resistor 17 of amplifier 22, whereby the offset currents flowing into terminals 21 and 23 from amplifier 22 are equal under quiescent conditions when the voltage of source 11 is zero. The offset currents flowing into terminals 21 and 23 remain equal to each other, but are variable, as the temperature to which amplifier 22 is subjected changes. The magnitude of the currents flowing into terminals 21 and 23 remains constant with changes in temperature because the impedance to ground of each of input terminals 21 and 23 remains constant as the temperature varies.

In the prior art, it is the practice to connect terminal 23 to ground through a relatively low resistance, such as resistance 36, having a value of 10,000 ohms, and to connect this small resistance directly to terminal 23. In the present measuring application, however, where it is desired to measure voltages of source 11 having full scale values of 10 millivolts between terminals 16 and 14, it has been found that this prior art technique is not sufficiently accurate. The difference in the offset currents applied to terminals 21 and 23 by the internal circuitry of amplifier 22 is sufficiently great, in many instances, to be on the same order of magnitude as the current supplied by source 11. In such an instance, of course, completely erroneous results are derived by meter 37. With the present circuit arrangement, these problems are overcome by connecting both the positive and negative input terminals 21 and 23 of amplifier 22 to ground through resistances having approximately the same magnitude.

To provide a better understanding as to the manner in which the resistances connected to terminals 21 and 23 balance the offset currents for thermal compensation of amplifier 22, a pair of explanatory examples is given. In the first example, it is assumed that matched field effect transistors 25 and 26 are at a temperature where they have equal drain gate impedances of $10^8$ ohms. The impedances of resistors 27, 28 and 31 are considered negligible compared to the impedances of the remaining circuits being discussed, and the voltages at terminals 29 and 30 are assumed to be +15 volts. Under the assumed conditions, the offset current flowing from the gate of field effect transistor 25 to the drain thereof, is:

$$I = \frac{E_{29}}{R_{GD} + R_{17} + R_{13}} = \frac{15}{10^8 + 10^7 + 2.2 \times 10^7} = 0.115 \ \mu a \quad (1)$$

where:

$E_{29}$ is the voltage at terminal 29;

$R_{GD}$ is the resistance between the gate and drain electrodes of field effect transistor 25;

$R_{17}$ is the resistance of resistor 17; and $R_{13}$ is the resistance of resistor 13.

Similarly, the negative current flowing into terminal 23 has the same value, but in an opposite sense, as the current flowing into terminal 22.

It is now assumed that the temperature to which amplifier 22 is subjected is increased, whereby the gate drain resistances of field effect transistors 25 and 26 are decreased to $9 \times 10^7$ ohms. The current now flowing through each of terminals 21 and 23 is computed in accordance with:

$$I = \frac{15}{9 \times 10^7 + 10^7 + 2.2 \times 10^7} = 0.123 \; \mu a \quad (2)$$

Because the D.C. impedances to ground seen by terminals 21 and 23 remain constant with variations in the drain gate impedances of field effect transistors 25 and 26, the offset currents fed through these terminals remain constant and temperature changes do not cause different voltages to be generated and produce erroneous results at output terminal 24.

If, however, terminal 23 were connected to ground through a low impedance resistor, having a value of 10,000 ohms, rather than a resistor equal approximately to the D.C. impedance seen by looking back from terminal 21 to source 11, the current flowing through terminal 23 would be represented as:

$$I = \frac{E_{30}}{R_{GD}} = \frac{15}{9 \times 10^7} = 0.190 \; \mu a \quad (3)$$

where: $E_{30}$ is the voltage magnitude at terminal 30.

Comparing Equations 2 and 3 it is seen that there is approximately a 50% change in the offset current when 32 megohm resistor 33 is included between terminal 23 and resistance 36. With low voltage sources such as contemplated herein for source 11, this difference in accuracy is sufficient to affect the voltage developed at output terminal 24 materially, whereby the different offset currents result in a substantial error in the output voltage of amplifier 22.

A further feature of the invention is the virtually complete attenuation of any A.C. pickup across the large valued resistors 17 and 33, as well as source 11. Filtering capacitors 18, 19, 34 and 35 across the relatively large valued resistors obviate the problem that these resistors inherently have of picking up stray A.C. 60 cycle voltages. The impedances of the capacitors are such that the A.C. voltages are reduced substantially to zero. Any residual A.C. voltage between input terminal 21 and ground is bucked by the A.C. voltage applied by the negative feedback loop from output terminal 24 to the negative input terminal 23. To this end, capacitors 34 and 35 are selected so that the amplitude of the residual A.C. voltages at terminals 21 and 23 are equal and opposite.

In designing the circuit, it was found that elimination of the A.C. components is accomplished initially with capacitors 34 and 35 in the feedback loop. Increasing the feedback capacity beyond 0.5 microfarad produced no noticeable improvement in reducing the A.C. output of amplifier 22 at terminal 24. Considerable further improvement was noted, however, by properly selecting the values of capacitors 18 and 19, with the values mentioned supra.

Capacitors 18 and 19, however, should not be so large that the RC time constant of the input circuit connected between terminal 21 and ground through source 11 is in excess of 5 seconds. If the time constant is greater than 5 seconds, a user of the meter becomes impatient because of the relatively long time that is required for meter 37 to reach a value commensurate with the voltage of source 11. With the present circuit, the RC time constant of the input circuit between terminals 21 and ground is on the order of 2 seconds, a value that has provided quite satisfactory results. In general, a 1:2 ratio between the 60 cycle reactance of capacitor 34 to the parallel combined reactances of capacitors 18 and 19 has been found to produce the most desirable filtering results.

Reference is now made to FIG. 2 of the drawings, wherein there is illustrated a complete circuit diagram of the apparatus schematically illustrated by FIG. 1, excluding the details of operational amplifier 22. From FIG. 2, it is seen that the apparatus includes five distinct full scale ranges for the voltage generated by source 11, namely 10 millivolts, 25 millivolts, 100 millivolts, 250 millivolts, and 1,000 millivolts. To establish these five different levels, as well as a zero adjusting capability, a switch having three ganged armatures 41–43 is provided. Each of armatures 41–43 separately and selectively engages one of six contacts.

For zero adjustment, contact 41 bridges the parallel combination of 22 megohm resistor 44 and 0.005 microfarad capacitor 45 across terminals 14 and 16 of source 11, thereby simulating the maximum expected impedance of the source. Simultaneously, armature 42 connects 10,000 ohm calibrated resistor 46, one of the elements comprising variable resistance 36, between ground and the junction between feedback resistors 32 and 33. At the same time, armature 43 connects the output terminal of amplifier 22 through meter 37 to ground through the series combination of resistors 47 and 48, which comprise resistor 38, FIG. 1. The value of resistor 47 is selected in a precise manner so as to compensate for deviations in the values of the other impedances employed when the system is being calibrated for zero adjustment.

After the zero adjustment has been made, armatures 41–43 are translated so that they selectively engage one of the five remaining contacts associated with the five different full scale voltages of source 11. In each of the measuring positions, armature 41 is open circuited while armature 42 selectively engages resistors having values of 10,000 ohms, 25,000 ohms, 100,000 ohms and 250,000 ohms for each of the full scale settings of 10 millivolts, 25 millivolts, 100 millivolts and 250 millivolts, respectively. For the 1,000 millivolt full scale voltage, armature 42 is open circuited because the feedback current from terminal 24 to terminal 23 of amplifier 22 is sufficiently great to provide for the thermal offset current. As armatures 41 and 42 are translated over the six contacts associated with the zero adjustment and different full scale voltages of source 11, armature 43 selectively is connected to different resistors having approximately 10,000 ohms impedance. The values of the resistances connected to armature 43 are adjusted to provide calibration for the different scale factors, whereby precision resistors need not be employed in the remainder of the circuit.

To enable both positive and negative polarities of source 11 to be measured, output terminal 24 of amplifier 22 is connected through reversing switch 51 to the terminals of 50 microammeter 37. Reversing switch 51 comprises ganged armatures 52 and 53 connected to terminal 24 and one of the terminals of microammeter 37, respectively. In the well-known manner, ganged armatures 52 and 53 are selectively connected to one or the other of the terminals of microammeter 37 to enable the meter movement to be deflected in the same direction regardless of the polarity of the voltage generated by source 11.

D.C. supply for amplifier 22 and variable D.C. bucking source 15 is derived from regulated power supply 61, having input terminals connected to a 60 cycle A.C. line. At the output terminals 62 and 63 of D.C. power supply 61 there are respectively derived voltages having values of plus and minus 15 volts. The voltage at terminals 62 and 63 are connected through 1,000 ohm resistors 64 and 65 to ground and to the positive and negative supply terminals 66 and 67 of amplifier 22. The internal voltage applied to amplifier 22, for balancing purposes, is further adjusted by connecting the positive voltage at terminal 66 through series connected resistors 67 and 68 to a "trim" terminal 69, included with the Philbrick amplifier, previously specified.

Bucking voltage source 15, FIG. 1, is established by connecting terminals 62 and 63 to contacts 71 and 72, respectively. Contacts 71 and 72 are selectively engaged by armature 73 of three position switch 74. Switch 74 includes a second armature 75, ganged with armature 73, for selectively connecting terminals 76, 77 and 78 to ground. In the center position of switch 74, wherein armatures 73 and 75 engage contacts 77 and 79, terminal 14 of source 11 is grounded and variable D.C. supply 15 is removed from the circuit. With armatures 73 and 75 engaging contacts 71 and 76, respectively, the voltage of source 15 is positive to buck the negative voltage of voltage source 11 being measured, while the voltage of source 15 is negative when contacts 73 and 75 alight on contacts 72 and 78, respectively.

To establish ten 100 millivolt discrete levels for variable source 15, voltage divider 81, comprising ten 50 ohm resistors 82 is established from ground to one terminal of 7,000 ohm resistor 83, the other terminal of which is connected to armature 73 of switch 74. The lowest potential end of each of resistors 82 is connected to one of the contacts 84 denominated as 1–10, respectively, while the upper end of each of resistances 82 is connected to one of the contacts 85 denominated as 1–10, respectively. Thus, the lower end of the resistor 82 that is connected to ground is connected to the terminal 84 denominated as 1,- while the upper end of the same resistor is connected to the terminal 85 denominated as 1. Selectively connected across contacts 84 and 85 are ganged armatures 86 and 87, respectively. Bridging armatures 86 and 87 is potentiometer 88, having the contact 89 thereof connected to terminal 14 of source 11. By connecting potentiometer 88 between terminal 14 and resistors 82 of voltage divider 81, resolution of variable source 15 can be achieved down to 100 microvolts.

While I have described and illustrated one specific embodiment of my invention, it will be clear that variations of the details of construction which are specifically illustrated and described may be made without departing from the true spirit and scope of the invention.

I claim:

1. A measuring gauge comprising a probe for generating a variable DC output voltage and having a DC source impedance susceptible to variations from between a minimum of 1 megohm and a maximum of 22 megohms, a semiconductor differential operational amplifier having a pair of signal input terminals and an output terminal for deriving a voltage proportional to the difference of the voltages at said input terminals, said amplifier supplying equal magnitude DC offset currents to said input terminals under quiescent conditions, the DC internal amplifier impedance between each of said input terminals and a common terminal varying similarly as a function of temperature, a DC signal path between said probe and one of said input terminals, a DC impedance of predetermined value connected in a negative feedback path between said output terminal and the second input terminal, the DC value of said impedance being sufficiently great that the DC offset current magnitudes supplied to said input terminals remain constant as the amplifier temperature varies and being on the same order of magnitude as the maximum DC value to which the DC source impedance is susceptible plus the DC impedance of the DC signal path, said amplifier having a DC input impedance sufficiently great whereby said DC offset currents are on the same order of magnitude as DC currents derived from said probe at low voltage and the maximum impedance, and means for measuring the voltage between said output and common terminals.

2. The system of claim 1 further including another D.C. impedance connected in said D.C. signal path, first capacitance means connected in circuit with said source and said another D.C. impedance for providing a low impedance to a common terminal for stray A.C. voltages developed across the probe, and second capacitance means shunting said impedance in the negative feedback path for providing a low impedance around said feedback impedance for stray A.C. voltages developed across said feedback impedance.

3. The system of claim 2 wherein the RC time constant of said first capacitance means, said source and said another impedance is less than five seconds, the ratio of the reactances of said first to said second capacitance means being on the order of 0.5 at the frequency of said stray A.C. currents.

4. The system of claim 3 wherein said another impedance has a magnitude on the order of ten megohms and said impedance in the negative feedback path has a magnitude on the order of 32 megohms.

5. The gauge of claim 4 wherein said negative feedback path further includes a resistor connected between said output terminal and a first terminal of said D.C. impedance, third capacitance means shunting said resistor for providing a low impedance for stray A.C. voltages developed across said resistor, the other terminal of said D.C. impedance being connected to said another input terminal, and variable resistance means selectively shunting said first terminal to said common terminal.

6. The gauge of claim 5 further including a source of D.C. bucking voltage connected in series with said probe.

7. A measuring gauge comprising a probe for generating a variable DC output voltage and having a DC source impedance susceptible to variations from between a minimum of 1 megohm and a maximum of 22 megohms, a semiconductor differential operational amplifier having a pair of signal input terminals and an output terminal for deriving a voltage proportional to the difference of the voltages at said input terminals, said amplifier supplying equal magnitude DC offset currents to said input terminals under quiescent conditions, the internal amplifier DC impedance between each of said input terminals and a common terminal varying similarly as a function of temperature, a DC signal path between said probe and one of said input terminals, a DC impedance of predetermined value connected in a negative feedback path between said output terminal and the second input terminal, the DC value of said impedance being sufficiently great that the DC offset current magnitudes supplied to said input terminals remain constant as the amplifier temperature varies and being on the same order of magnitude as the maximum value to which the DC source impedance is susceptible plus the impedance of the DC signal path, said amplifier having a DC input impedance sufficiently great whereby said offset currents are on the same order of magnitude as currents derived from said probe at low voltage and the maximum impedance.

References Cited

UNITED STATES PATENTS

| | | | |
|---|---|---|---|
| 2,796,468 | 6/1957 | McDonald | 330—69 |
| 3,142,799 | 7/1964 | Kovalovski | 324—99 |
| 3,287,653 | 11/1966 | Goordman | 330—18 |
| 3,392,333 | 7/1968 | Blondfield | 324—140 |
| 2,993,171 | 7/1961 | Kelsey | 324—123X |
| 3,405,368 | 10/1968 | Howe | 330—28X |

RUDOLPH V. ROLINEC, Primary Examiner

E. F. KARLSEN, Assistant Examiner

U.S. Cl. X.R.

324—123; 330—28, 30